US010936195B2

(12) United States Patent
Liu et al.

(10) Patent No.: US 10,936,195 B2
(45) Date of Patent: Mar. 2, 2021

(54) DATA STORAGE SYSTEM USING IN-MEMORY STRUCTURE FOR RECLAIMING SPACE FROM INTERNAL FILE SYSTEM TO POOL STORAGE

(71) Applicant: EMC IP Holding Company LLC, Hopkinton, MA (US)

(72) Inventors: Xianlong Liu, Shanghai (CN); Changyong Yu, Shanghai (CN); Ruiling Dou, Shanghai (CN); Alexander S. Mathews, Morganville, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 579 days.

(21) Appl. No.: 15/797,323

(22) Filed: Oct. 30, 2017

(65) Prior Publication Data
US 2019/0129622 A1 May 2, 2019

(51) Int. Cl.
*G06F 3/06* (2006.01)

(52) U.S. Cl.
CPC .......... *G06F 3/0608* (2013.01); *G06F 3/0631* (2013.01); *G06F 3/0652* (2013.01); *G06F 3/0665* (2013.01); *G06F 3/0689* (2013.01)

(58) Field of Classification Search
CPC .... G06F 16/122; G06F 11/1435; G06F 16/10; G06F 16/1727; G06F 2201/84; G06F 2209/503; G06F 2211/1088; G06F 3/0608; G06F 3/061; G06F 3/0665; Y02D 10/22; Y10S 707/99956

USPC ............... 707/812, 821–828, 831, E17.055, 707/E17.067, E17.138
See application file for complete search history.

(56) References Cited

U.S. PATENT DOCUMENTS

| | | | | |
|---|---|---|---|---|
| 6,324,581 B1 * | 11/2001 | Xu | ........................ | H04L 29/06 709/229 |
| 7,631,155 B1 * | 12/2009 | Bono | .................... | G06F 3/0608 711/156 |
| 8,285,758 B1 * | 10/2012 | Bono | .................... | G06F 16/119 707/822 |
| 8,407,265 B1 * | 3/2013 | Scheer | ................ | G06F 16/1727 707/823 |
| 8,407,445 B1 * | 3/2013 | Pathak | .................. | G06F 3/0683 711/170 |

(Continued)

*Primary Examiner* — Alex Gofman
*Assistant Examiner* — Linh Black
(74) *Attorney, Agent, or Firm* — BainwoodHuang (57) ABSTRACT

A data storage system manages use of a pool of secondary storage by internal file systems hosting logical data storage objects accessed by clients. A choose-and-mark-slices operation scans the file system to identify a subset of the slices as evacuatable slices to be de-provisioned and returned to the pool, the subset having a size exceeding a per-iteration limit observed by a separate evacuate-slices operation. The subset is recorded in an in-memory structure. Each iteration of the evacuate-slices operation (1) examines the in-memory structure to select slices for evacuation, no more than the per-iteration limit being selected, (2) moves data from the selected slices to the remaining slices of the set, and (3) subsequently (i) updates metadata of the file system to reflect the moving of the data and (ii) de-provisions the selected slices from the file-system to return them to the pool for subsequent re-provisioning.

22 Claims, 10 Drawing Sheets

(56) References Cited

U.S. PATENT DOCUMENTS

| | | | | |
|---|---|---|---|---|
| 8,566,371 | B1* | 10/2013 | Bono | G06F 16/119 |
| | | | | 707/822 |
| 9,400,741 | B1 | 7/2016 | Bono et al. | |
| 9,864,753 | B1* | 1/2018 | Armangau | G06F 3/0652 |
| 10,082,959 | B1* | 9/2018 | Chen | G06F 3/0634 |
| 10,210,296 | B2* | 2/2019 | Baumgartner | G06F 30/3323 |
| 2005/0195975 | A1* | 9/2005 | Kawakita | H04L 9/0825 |
| | | | | 380/30 |
| 2006/0075191 | A1* | 4/2006 | Lolayekar | G06F 3/0613 |
| | | | | 711/114 |
| 2008/0263114 | A1* | 10/2008 | Nath | G06F 16/2246 |
| 2011/0075596 | A1* | 3/2011 | Moreira | H04W 72/02 |
| | | | | 370/310 |
| 2011/0299317 | A1* | 12/2011 | Shaeffer | G11C 13/0035 |
| | | | | 365/106 |
| 2014/0337010 | A1* | 11/2014 | Akolkar | G06F 16/3329 |
| | | | | 704/9 |
| 2015/0106556 | A1* | 4/2015 | Yu | G06F 13/1694 |
| | | | | 711/103 |
| 2017/0133107 | A1* | 5/2017 | Ryan | G11C 16/16 |
| 2017/0344264 | A1* | 11/2017 | Blaettler | H03M 7/3084 |

\* cited by examiner

List Head
Marked=0

60 — PERFORM CHOOSE-AND-MARK-SLICES OPERATION THAT INCLUDES SCANNING SET OF SLICES OF FILE SYSTEM TO IDENTIFY, BASED ON DATA OCCUPANCY OF SLICES, A SUBSET OF SLICES AS EVACUATABLE SLICES TO BE DE-PROVISIONED AND RETURNED TO THE POOL, THE SUBSET STORING DATA TO BE MOVED TO REMAINING SLICES OF THE SET BY ITERATIONS OF SEPARATE EVACUATE-SLICES OPERATION, THE SUBSET HAVING A SIZE EXCEEDING A PREDETERMINED FIXED PER-ITERATION LIMIT OBSERVED BY THE EVACUATE-SLICES OPERATION IN EACH ITERATION THEREOF, THE SLICES OF THE SUBSET BEING RECORDED IN AN IN-MEMORY STRUCTURE TO COMMUNICATE AN IDENTIFICATION OF THE SUBSET TO THE EVACUATE-SLICES OPERATION

62 — REGULARLY PERFORM THE ITERATIONS OF THE EVACUATE-SLICES OPERATION, EACH ITERATION (1) EXAMINING THE IN-MEMORY STRUCTURE TO SELECT SLICES FOR EVACUATION FROM AMONG THE EVACUATABLE SLICES, WITH NO MORE THAN THE PER-ITERATION LIMIT OF OCCUPIED SLICES BEING SELECTED, (2) MOVING DATA FROM THE SELECTED SLICES TO THE REMAINING SLICES OF THE SET TO THEREBY EMPTY THE SELECTED SLICES, AND (3) SUBSEQUENTLY (I) UPDATING METADATA OF THE FILE SYSTEM TO REFLECT THE MOVING OF THE DATA AND (II) DE-PROVISIONING THE SELECTED SLICES FROM THE FILE-SYSTEM TO RETURN THEM TO THE POOL FOR SUBSEQUENT RE-PROVISIONING TO THE FILE SYSTEMS

DATA STORAGE SYSTEM USING IN-MEMORY STRUCTURE FOR RECLAIMING SPACE FROM INTERNAL FILE SYSTEM TO POOL STORAGE

BACKGROUND

The present invention relates to data storage systems providing secondary data storage to storage clients such as host computers, and in particular relates to data storage systems using internal file systems with reclaiming of unused storage space for re-provisioning to other file systems sharing the same storage pool.

SUMMARY

File system space reclamation is a mechanism used to reclaim unused physical storage provisioned in a file system and return reclaimed storage to an underlying storage pool such that it can be utilized by other storage objects (LUNs or file systems) drawing storage from the same storage pool. Generally, reclamation involves a set of selecting and marking unused ("free") units, called "slices", and then evacuating the marked slices to completely remove them from the file system and return them to the pool. However, the separation of marking from evacuation can have unwanted effects, including the potential for duplicative scanning of slices, excessive data movement when data is moved into slices that are later marked for evacuation, and unawareness of concurrent system events that free additional space and might render a current marking sub-optimal.

A disclosed approach addresses such potential drawbacks, by using some/all of the following:
1) Introduce a per file system in-memory list to store the slices positions which are retrieved during the scanning of choose-and-mark-slices, which can be utilized by the separate evacuate-slices. This prevents duplicate scanning work at the evacuate-slices step.
2) While retaining a per-iteration limit on evacuate-slices, for reasons discussed below, nonetheless perform the choose-and-mark-slices operation without regard to that limit. In one example, all evacuatable slices in the file system are marked, and the number that are marked at any given time is tracked. This can reduce unnecessary data block movement.
3) Continually monitor the number of evacuatable slices, and when the gap between the number of marked slices and the evacuatable slices crosses some predefined threshold, re-perform choose-and-mark-slices to mark all current evacuatable slices.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

File system space reclamation is a mechanism used to reclaim unused physical storage provisioned in a file system and return reclaimed storage to an underlying storage pool such that it can be utilized by other storage objects (LUNs or file systems) drawing storage from the same storage pool. Generally, reclamation involves a set of selecting and marking unused ("free") units, called "slices", and then evacuating the marked slices to completely remove them from the file system and return them to the pool. However, the separation of marking from evacuation can have unwanted effects, including the potential for duplicative scanning of slices, excessive data movement when data is moved into slices that are later marked for evacuation, and unawareness of concurrent system events that free additional space and might render a current marking sub-optimal.

A disclosed approach addresses such potential drawbacks, by using some/all of the following:
4) Introduce a per file system in-memory list to store the slices positions which are retrieved during the scanning of choose-and-mark-slices, which can be utilized by the separate evacuate-slices. This prevents duplicate scanning work at the evacuate-slices step.
5) While retaining a per-iteration limit on evacuate-slices, for reasons discussed below, nonetheless perform the choose-and-mark-slices operation without regard to that limit. In one example, all evacuatable slices in the file system are marked, and the number that are marked at any given time is tracked. This can reduce unnecessary data block movement.
6) Continually monitor the number of evacuatable slices, and when the gap between the number of marked slices and the evacuatable slices crosses some predefined threshold, re-perform choose-and-mark-slices to mark all current evacuatable slices.

This description uses the term "block" to refer to units of secondary storage, consistent with its general use in descriptions of data storage systems and associated technology. For example, a block is generally the unit of addressing in SCSI or similar storage protocols that employ logical block addresses (LBA). A typical block size is 4 K (kilobytes), for example. Other specific block sizes may of course be used. Another data unit herein is a "slice", which is a much larger contiguous extent such as 256 MB, suitable as a unit of provisioning raw storage space to a file system. The non-standard term "segment" is also used below to refer to some arbitrary block-multiple unit that may be suitable as a unit of data movement in space reclaiming operations.

Figure 1:
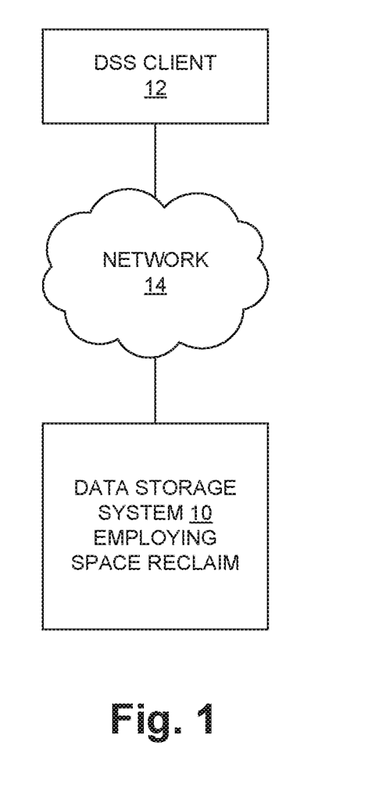
FIG. 1 is a block diagram of a data processing system.

FIG. 1 shows a computer system having a data storage system 10 coupled to one or more data storage system (DSS) clients 12 by a network 14. In a typical case a DSS client 12 is a host computer such as a server computer executing one or more application programs (applications) for which the secondary storage (block or file) is maintained by the data storage system 10, with the network 12 conveying data storage requests and responses, as well as associated data. For example, a DSS client 12 performs a write operation to a block-oriented storage device by issuing a write request that specifies the device, the starting logical address, and the length, as well as the associated write data. The network 12 conveys the write request and write data to the data storage system 10, which stores the write data on the identified device beginning at the specified logical address. A DSS client 12 performs a read operation to a block-oriented device by issuing a read request that specifies the device, the starting logical address, and the length. The network 12 conveys the read request to the data storage system 10, which obtains the data from the specified device beginning at the specified logical address and returns the data to the DSS client 12 via the network 14. As explained more below, the data storage system 10 may present storage resources to the DSS clients 12 in alternative ways, such as in the form of a network-level or distributed file system, or as virtual volumes or similar virtualized storage containers that are understood by DSS clients 12 hosting virtual machines, such as ESX® hosts (servers) for example.

As indicated at 10, the data storage system 10 employs a certain technique freeing or reclaiming unused space by processes performed on an internal file system. Details and advantages of this technique are described below.

Figure 2:
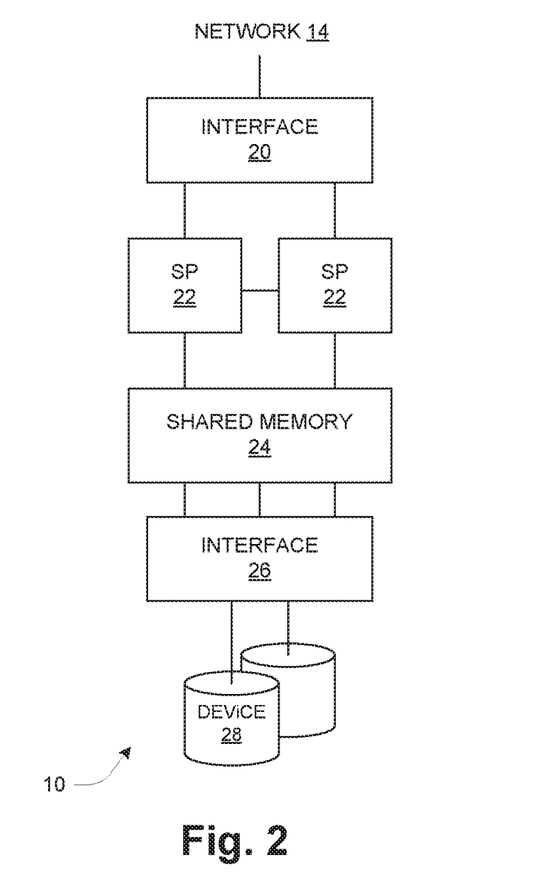
FIG. 2 is a block diagram of a data storage system.

FIG. 2 is a block diagram of the data storage system 10 from a hardware perspective. It includes an interface 20 to the network 14, a pair of storage processors (SPs) 22, shared memory 24, and an interface 26 to secondary storage devices (DEVICE) 28, such as magnetic disks, Flash drives, etc. The interface 20 may include one or more network adapters such as a FibreChannel adapter, Gigabit Ethernet adapter, etc., and the interface 26 may similarly include storage-oriented adapters such as FibreChannel adapters etc. Each storage processor 22 executes software causing the storage processor 22 to present logical or virtualized storage resources to the network 14 and DSS clients 12, employing the devices 28 for the underlying physical storage. The logical or virtualized storage resources may include either or both block-oriented devices (e.g., logical storage units (LUNs), virtual volumes (VVOLS), etc.) and/or client-visible file systems (e.g., NFS, CIFS, etc.) The shared memory 24 may be used for one or more device caches, also referred to as a "storage cache", for caching data of the devices 28. Further details of the structure and operation of the data storage system 10 are provided below.

Figure 3:
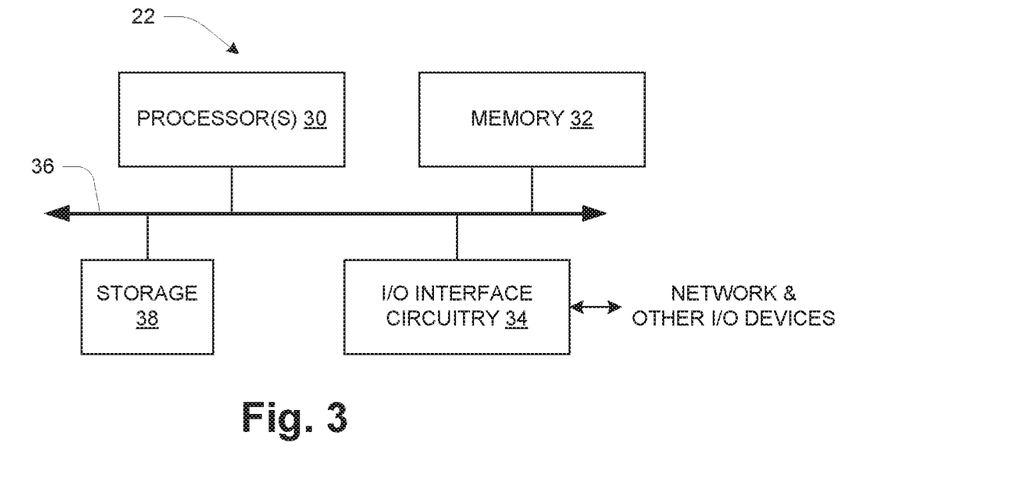
FIG. 3 is a block diagram of a storage processor from a hardware perspective.

FIG. 3 shows an example configuration of a storage processor 22 from a computer hardware perspective. The hardware includes one or more processors 30, memory 32, and interface circuitry 34 interconnected together by data interconnections 36 such as one or more high-speed data buses. The interface circuitry 34 provides a hardware connections to the shared memory 24 and interfaces 20, 26 (FIG. 2) and perhaps other external devices/connections (EXT DEVs). The processor(s) 30 with connected memory 32 may also be referred to as "processing circuitry" herein. A storage processor 22 may also have its own local secondary storage 38 such as a Flash memory array. In operation, the memory 32 stores data and instructions of system software (e.g., operating system) and one or more application programs which are executed by the processor(s) 30 to cause the hardware to function in a software-defined manner. Thus the computer hardware executing instructions of a data storage application, such as described below, can be referred to as a data storage circuit or data storage component, and it will be understood that a collection of such circuits or components can all be realized and interact with each other as one or more sets of computer processing hardware executing different computer programs as generally known in the art.

Figure 4:
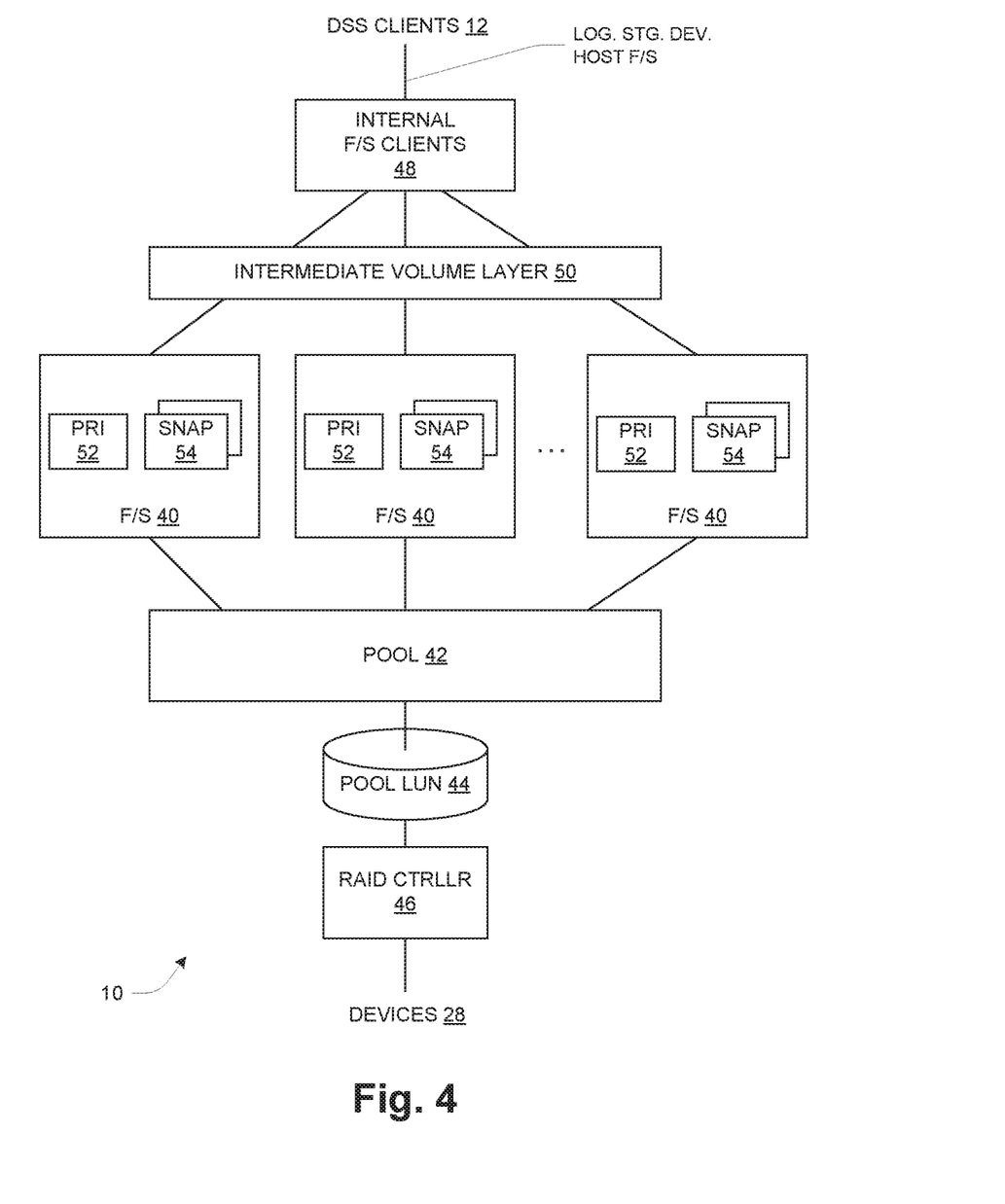
FIG. 4 is a block diagram of a storage processor from a software perspective, showing an arrangement of software-implemented functional modules.

FIG. 4 is a functional block diagram of the data storage system 10, the functional blocks generally being realized by execution of computer program instructions by the storage processor hardware as shown in FIG. 3. This description focuses on certain aspects of the functional structure and operation, specifically the use of one or more internal file systems (F/S) 40 which draw their underlying physical storage from the devices 28 via a certain organization as shown. This organization includes a pool 42 of data units called "slices" that are carved from an internal logical storage unit called a "pool LUN" 44, which in turn is presented by a RAID controller 46 implementing RAID over sets of the devices 28. Thus in general there may be a one-to-multiple mapping between the pool LUN 44 and corresponding devices 28 providing the RAID-protected underlying physical storage.

The internal file systems 40 are utilized by one or more internal file system clients 48 that present storage resources to the DSS clients 12. Examples of such presented resources include a logical storage device and a host file system as shown. An internal client 48 providing a host file system is referred to as a file-oriented internal client. A host-visible file system is referred to as an "upper" file system to distinguish it from the internal file system(s) 40, which are also referred to as "lower" file systems 40 herein. Logically interposed between the internal file system clients 48 and the lower file systems 40 is an intermediate logical volume layer 50 that presents logical volumes of storage to the internal file system clients 48. Each of these logical volumes, also referred to herein as "intermediate volumes", is stored in a respective file of a corresponding lower file system 40 and is referred to as a "volume file". Additionally, the data storage system 10 supports point-in-time copying of storage object data, with the copies being referred to as "snapshots" or "snaps". In this case, the object being copied may be referred to as the "primary" storage object and its snaps as "secondary" storage objects, and a given file system 40 hosts both the primary object as well as all its snaps. The primary object is typically the normal target of ongoing user I/O and thus the most up-to-date at any given time. A primary object is stored in a primary file 52, and secondary objects or snaps are stored in respective distinct snap or secondary volume files 54 of the given file system 40.

The remaining description focuses on file system space reclamation, which is used to reclaim free physical storage provisioned in a given lower file systems 40 and return it to the underlying storage pool 42 such that it can be utilized by other objects (storage objects hosted on other file systems 40) in the same storage pool 42. Space reclamation has three major steps to achieve the space reclamation goal:

1) Invoke a first process called "choose-and-mark-slices" to select the slices that are suitable for evacuation according to different selection policies and put the target slices in a marked state for later evacuation. An intuitive policy is to select those slices which have the fewest allocated blocks (occupied by data), because less block movement is needed to reclaim that slice, but other policies also exist to achieve different goals.

2) Invoke a second process called "evacuate-slices" to evacuate the slices which are in the marked state. This involves block movement of the allocated blocks from the marked slices to other, unmarked slices of the file system and marking the slices as evacuated after all allocated blocks are relocated.

3) Invoke a third process called "remove-slice" to completely remove (de-provision) the slice from the file system and volume layer, and mark the slice as unused (or non-provisioned) in a slice allocation table used to manage the provisioning of slices of the pool 42 to the file systems 40.

The above steps 1 to 3 may be repeated until there are no evacuate-able slices in the file system 40.

The above multi-process approach is used in the interest of efficiency and flexibility in scheduling the use of compute resources (e.g., memory and CPU) in an operating data storage system 10. It will be appreciated that space reclamation is normally a background task, and as such it should consume resources only when not needed for higher priority tasks, such as servicing user I/O requests. Using the multi-process approach, marking the slices is separated from evacuating the slices, which promotes scheduling flexibility. Another feature is that evacuate-slices is done over multiple iterations rather than a single pass, with each iteration observing a per-iteration limit. This helps avoid contention with other slice-related processing, which can include regular file system operations that allocate blocks of provisioned slices to store newly written file system data, as well as a process called Virtual Pooling (VP) that regularly performs a considerable amount of slice relocation. The regular file system operations preferably examine the in-memory structure prior to any block allocation to ensure that the slice containing the block(s) is not marked for evacuation. The virtual pooling process may be unaware of the slice marking for evacuation, so the per-iteration limit is preferably selected to limit duplicate data movement that would occur if the virtual pooling process relocates slices marked for evacuation.

Nonetheless, using the multi-process approach could create the following problems depending on the specifics of how it is implemented. As explained below, these issues are avoided by a more particular multi-process approach with additional helpful features:

1) Duplicate scanning work in both choose-and-mark-slices and evacuate-slices operations. That is, in general, choose-and-mark slices scans all provisioned slices in all subspaces of the file system to find and mark the target slices for later evacuation. Assuming the slices are marked individually, then the evacuate-slices process must also scan all the slices in order to identify all the marked slices for evacuation processing. This duplicate work adds extra CPU and IO overhead for file system space reclamation, especially when trying to reclaim a relatively large number of slices in a single round.

2) The per-iteration limit (e.g., 4 slices) observed by evacuate-slices could create an issue of unnecessary data movement. As noted, not all evacuatable slices are actually evacuated in one iteration. The limit is observed because the evacuate-slices operation is exclusive to other operations like slice relocation of FASTVP, so this period of exclusivity is limited in order to minimize interference with such other operations. However, there can be duplicate data block movement when allocated data blocks in marked slices are copied to slices which are evacuated in a later round, requiring another movement of the data at that time.

3) In some cases, slices that are not marked may be more appropriate for evacuation compared to marked slices during the space reclaim life cycle, due to intervening data deletion (e.g., SNAP delete) in this period.

Thus the approach described herein addresses such potential issues by utilizing the following methods:

1) Introduce a per file system, in-memory structure (e.g., list) to store the slices positions which are retrieved during the subspaces scanning of choose-and-mark-slices, for use by evacuate-slices. This prevents duplicate scanning work at the evacuate-slices step.

2) Perform choose-and-mark-slices without specifying a particular number. In this case, all evacuate-able slices in the file system 40 are marked, and the current number of marked slices is also recorded. This reduces possible duplicate data block movement, because during a subsequent evacuate-slices operation, any block being moved out of a marked slice is moved to only an unmarked slice that is not currently identified for evacuation.

3) A per file system counter identifying the current number of marked slices is maintained in memory. When the gap between this current number of marked slices and the current number of evacuatable slices crosses some predefined threshold, the currently marked slices are unmarked internally and choose-and-mark-slices is re-performed to mark all current evacuatable slices. This operation provides a direct and fast response to events that free substantial amounts of data, such as deletion of an object (primary or snapshot), enhancing efficiency and effectiveness of space reclamation.

FIGS. 5-15 are used to illustrate the space reclamation process. Each of these Figures shows a simplified version of a set of slices initially allocated to a file system 40. Generally 12 slices are shown, numbered 1-12. This example also shows each slice divided into four (4) equal-size segments. Generally, the number of slices in a file system 40 will be much larger. In one embodiment the slice size is 256 MB, but this may vary in other embodiments. The sub-slice segment size may also vary, and could be as small as an individual block (e.g., 4 KB) in one embodiment. Those skilled in the art will appreciate that data unit sizes relate to tradeoffs between space efficiency and processing efficiency. The description below uses the term "blocks" to refer to the block or blocks that make up a segment.

Figure 5:
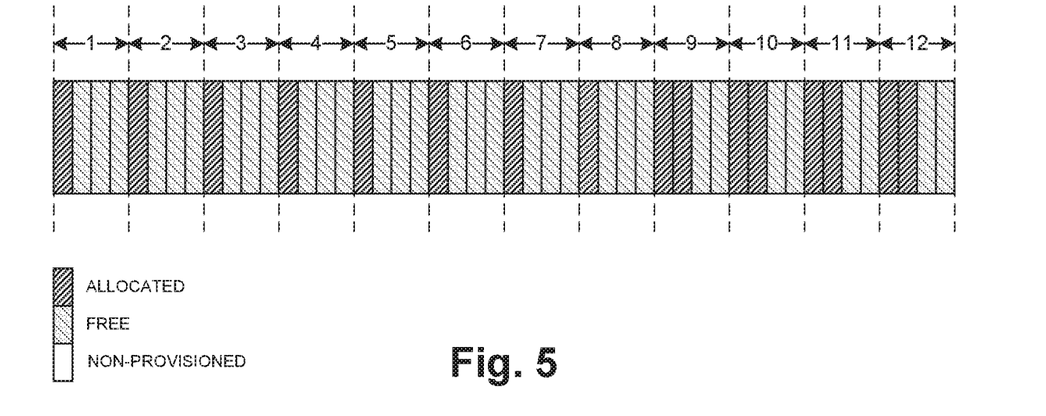
FIGS. 5-15 are schematic illustrations of sets of slices of data storage of an internal file system.

FIG. 5 shows an initial state of a set of slices of a file system 40. In totality there are 12 slices in the file system, numbered 1-12. With each slice divided into four segments, there are 48 total segments. In the illustrated example, 16 of the segments are "allocated" meaning that they contain file system data, and the remainder are "free", meaning that they have been provisioned to the file system but do not contain file system data. No segments are non-provisioned.

In theory, 8 slices can be reclaimed from the file system to be returned to the storage pool 42, because 16 allocated segments equates to 4 slices' worth of segments.

As outlined above, one possible approach to reclamation using separate choose-and-mark and evacuate-slices operations would create inefficiencies both by duplicated scanning and duplicated data movement. Assuming a per-iteration evacuation limit of 4 slices, for example, an inefficient process would first perform choose-and-mark-slices to select 4 slices for evacuation, which involves scanning the file system subspaces and finding slices numbered 1 to 4 as good candidates and setting the slices' states as marked for evacuation. Subsequently, evacuate-slices is performed to evacuate the previously marked slices. The evacuation process scans the subspaces again, finds slices 1 to 4 are marked, and moves the allocated blocks from slice 1 to 4 to slices 5 to 8, for example, which are not marked. Slices 1 to 4 are removed from file system 40 and volume layer and returned to storage pool 42. Then the above is repeated. In this iteration, choose-and-mark-slices selects slices 5 to 8. The evacuation process finds slices 5 to 8 are marked and moves the allocated blocks from slices 5 to 8 to slices 9 to 12. Slices 5 to 8 are removed from file system and volume layer and returned to storage pool.

The above process exhibits the following problems:
1) The whole subspace from slices 1 to 8 is scanned four times: two times in the choose-and-mark-slices phase and two times in evacuate-slices phase.
2) The allocated blocks in slices 1 to 4 are copied twice: first to slices 5-8 and then from slices 5-8 to slices 9-12.

FIGS. 6-10 describe an alternative method that avoids the above drawbacks. This example again assumes the initial state shown in FIG. 5. The space reclaim operation may be implemented in a state machine, and generally requires some type of initiation or triggering. One type of trigger that can be used is simply periodic triggering (timing based) with an appropriate interval, e.g., once per week for example. It may also be triggered in an event-based manner, such as upon deletion of storage objects (LUN/snaps), and/or when a zero-fill level (map-for-deallocate) reaches some predefined threshold.

Figure 6:
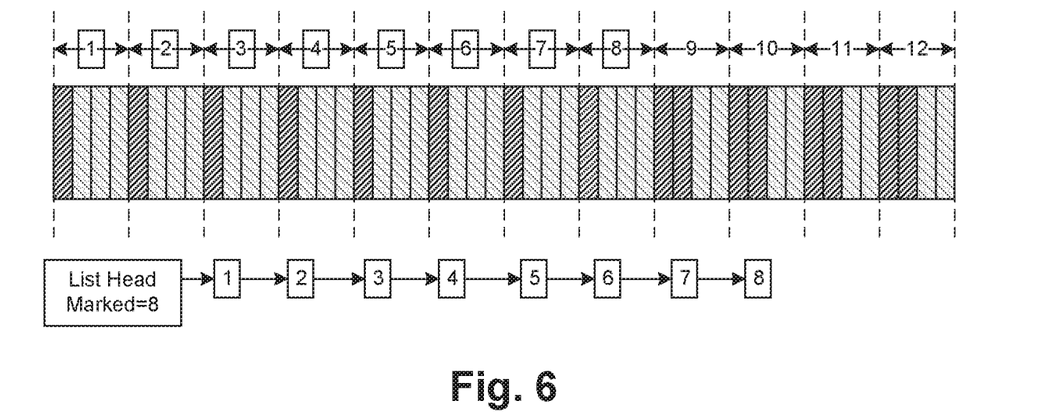

FIG. 6 illustrates of an initial performance of choose-and-mark-slices without specifying a limit on how many slices are to be marked. In this example, the F/S 40 internally calculates that there are eight (8) evacuatable slices and marks all of them, which is indicated in FIG. 6 by the squares around the slice numbers. Additionally, this marking is also recorded in a structure stored in system memory, referred to herein as an "in-memory structure". In one example this is a simple list. This lists is shown in FIG. 6. This structure also records the total number of marked slices, which at this time is 8. The list is preferably ordered by decreasing data occupancy of the slices, so that more-occupied slices are evacuated ahead of less-occupied slices.

Figure 7:
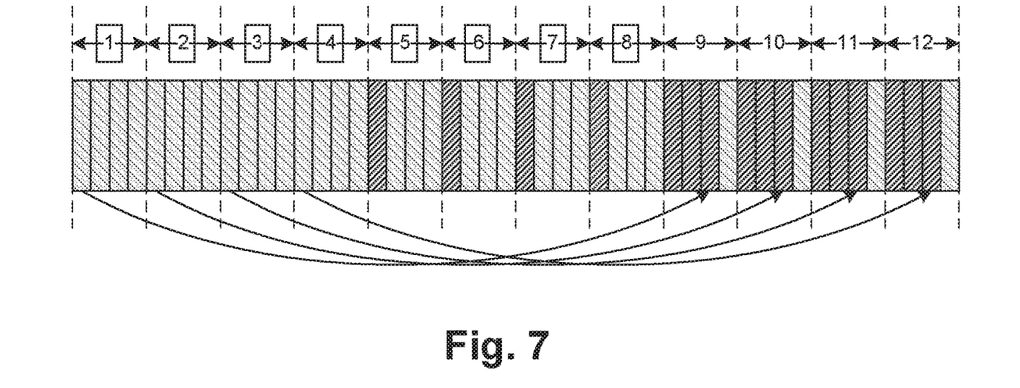

FIG. 7 illustrates the performance of evacuate-slices to evacuate previously marked slices. Since the in-memory list keeps information of the marked slices sorted by slice allocation status, the evacuation process does not scan the subspaces again. Evacuate-slices picks slices 1 to 4 in the list to evacuate. Because slices 5 to 8 are also marked, allocation is targeted to slices 9 to 12. i.e., the allocated blocks from slices 1-4 are relocated to slices 9-12.

Figure 8:
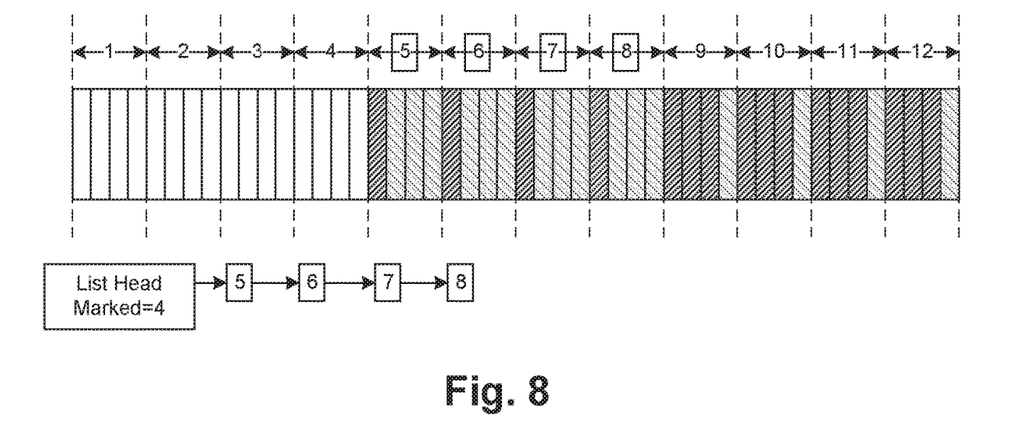

FIG. 8 shows the result of further processing by which slices 1 to 4 are removed from the file system and volume layer and returned to the storage pool 42. At this time, slices 5 to 8 remain as marked and identified in the in-memory list.

Figure 9:
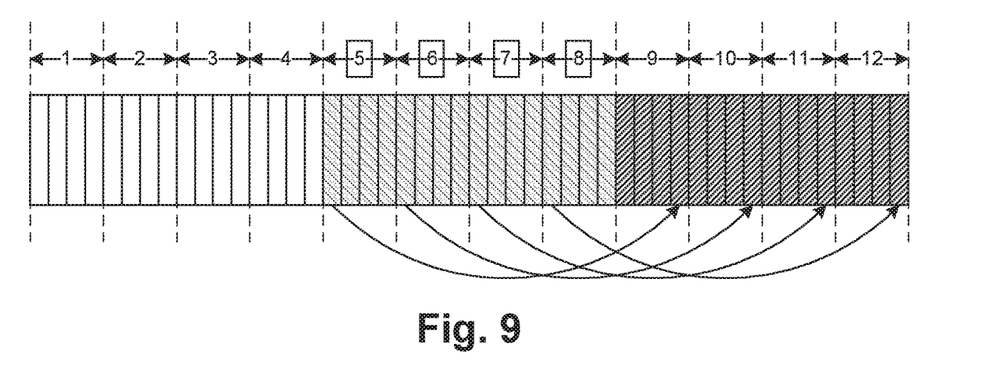

FIG. 9 shows a next iteration of evacuate-slices to evacuate remaining previously marked slices. Since the in-memory structure keeps information of the marked slices, the evacuation process does not scan the subspaces again. In this example, the allocated data from slices 5-8 is moved to slices 9-12.

Figure 10:
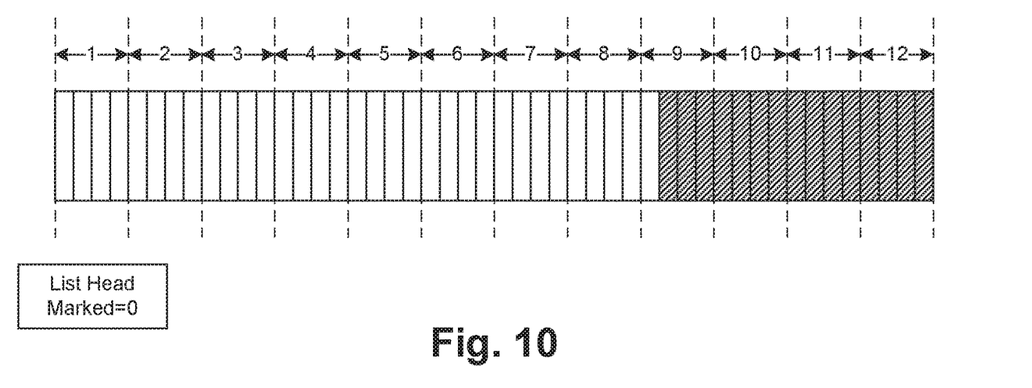

FIG. 10 shows the result of further processing by which slices 5 to 8 are removed from file system and volume layer and returned to storage pool 42. At this point there are no more marked slices in the list.

In the above process, the potential drawbacks described above (duplicate blocks movement and scanning subspace for marked slices) are avoided.

FIGS. 11-15 describe a variation of the process of FIGS. 5-10. With the in-memory information of marked slices, the evacuation process can be improved further when slices allocation status changes much during evacuate-slices. This process may be triggered in the same manner as described above.

Figure 11:
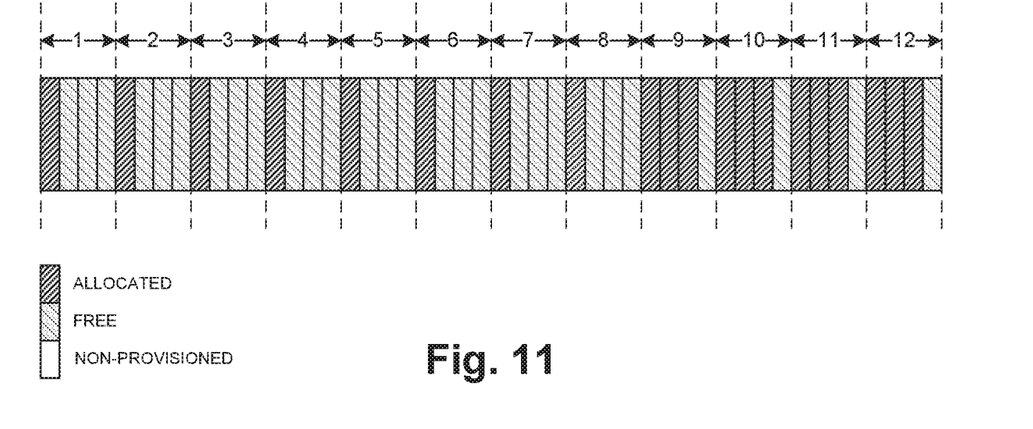

FIG. 11 shows the initial condition. There are 12 slices in the file system 40 with the slices allocation status as shown.

Figure 12:
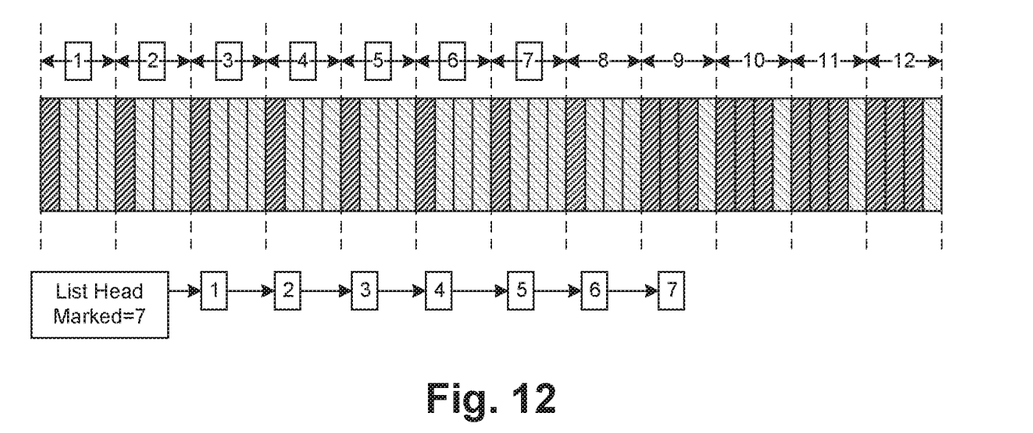

In FIG. 12, choose-and-mark-slices is performed. Seven (7) slices are marked and recorded in the in-memory structure.

Figure 13:
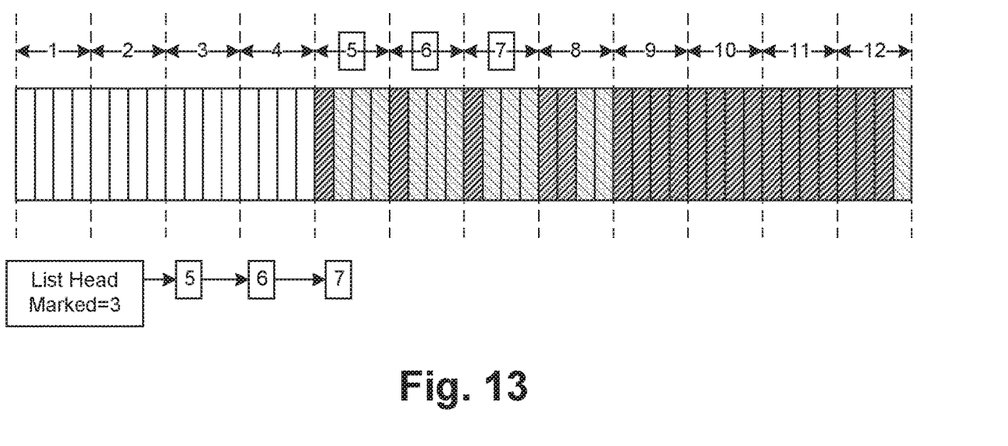
Figure 14:
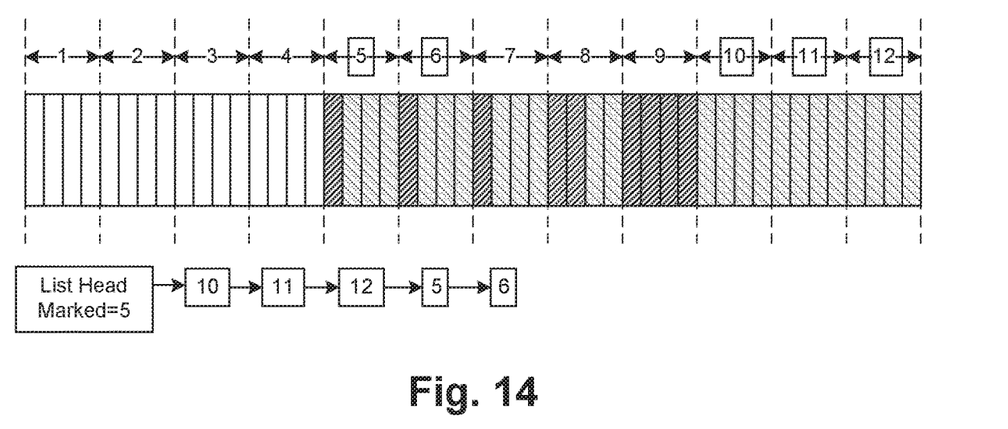
Figure 15:
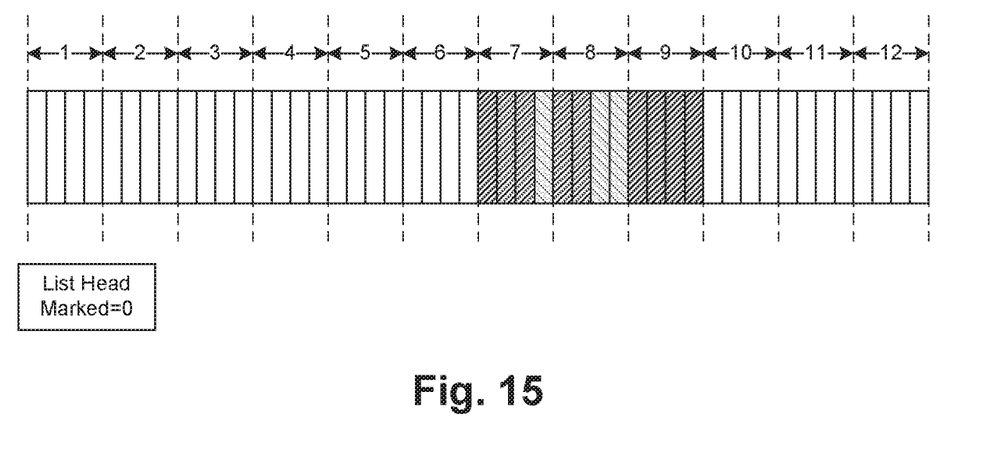

In FIG. 13, evacuate-slices is performed and four slices (1-4) are evacuated, with their data being moved to blocks 8-11. Subsequently, as shown in FIG. 14, data on slices 10-12 is separately freed (e.g., by separate operation of the file system 40) and now the slices status is as shown. While slices 5-7 remain marked and recorded in the in-memory structure, slices 10-12 are actually better candidates for evacuation, because they are completely empty. This condition can be detected by comparing the number of marked slices in memory (currently 3 in this example) with the number of evacuatable slices calculated from file system counters, which is currently 5. Thus, instead of just continuing to use the existing in-memory structure and moving allocated blocks from slices 5-7 to slices 10-12, the slices are unmarked internally and choose-and-mark-slices is performed again. Now slices 5-6 and 10-12 become marked, as shown in FIG. 14. FIG. 15 shows a later stage after evacuate-slices has been performed. The data of slices 5-6 has been moved to slices 7 and 8, and all of the empty slices 5-6 and 10-12 have removed and returned to the pool 42 (de-provisioned).

Figure 16:
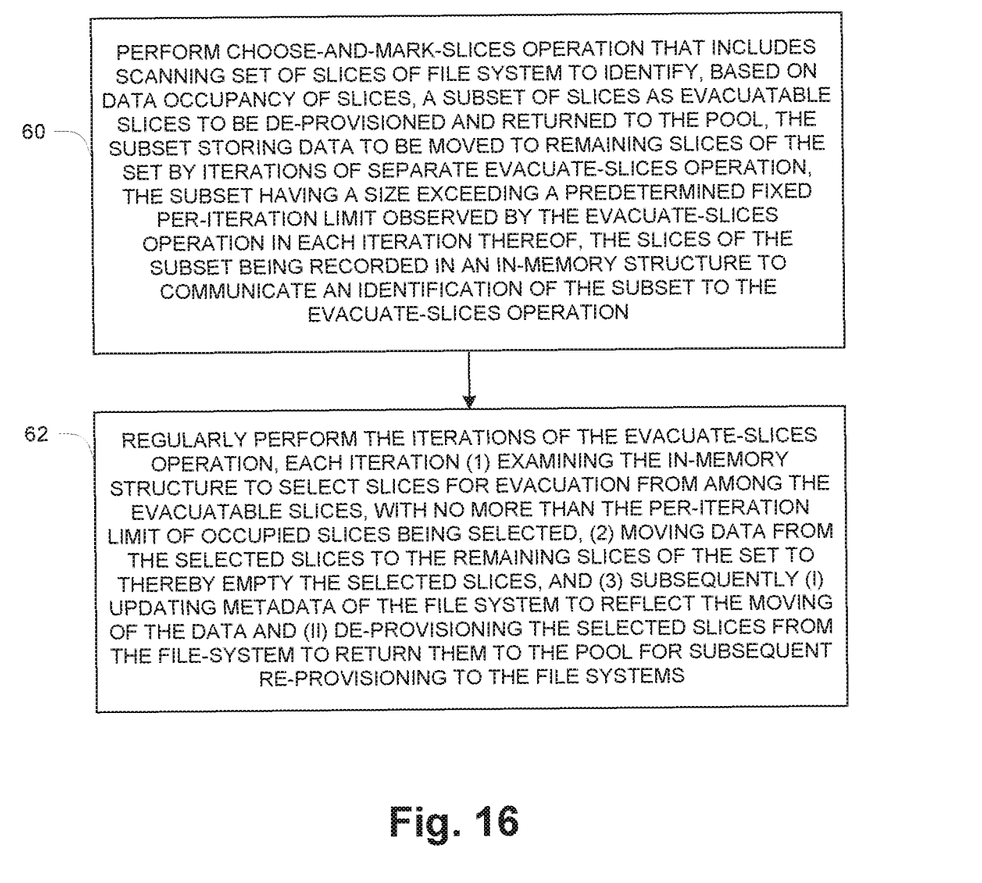
FIGS. 16 and 17 are flow diagrams of methods of operation.

FIG. 16 presents a high-level flow of operation as described herein according to a first aspect, which includes using an in-memory structure to record a number of evacuatable slices that generally exceeds the number that are evacuated in a given pass (iteration) of evacuate slices. An example is given above with reference to FIGS. 6-10. A data storage system (e.g. 10) is operated to manage use of a pool (e.g. 42) of secondary storage by internal file systems (e.g., 40) hosting respective logical data storage objects accessed by clients of the data storage system, the pool being organized into fixed-size slices dynamically provisioned to and de-provisioned from the file systems. The illustrated operation is for an individual file system, and it will be appreciated that it is repeated for other file systems drawing storage from the same pool.

At 60, a choose-and-mark-slices operation is performed that includes scanning a set of slices of the file system to identify, based on data occupancy of the slices, a subset of the slices as evacuatable slices to be de-provisioned and returned to the pool. The subset of slices stores data to be moved to remaining slices of the set by iterations of a separate evacuate-slices operation, and the subset has a size exceeding a predetermined fixed per-iteration limit observed by the evacuate-slices operation in each iteration thereof. The slices of the subset are recorded in an in-memory structure (e.g., list) to communicate an identification of the subset to the evacuate-slices operation.

At 62, iterations of the evacuate-slices operation are regularly performed, each iteration (1) examining the in-memory structure to select slices for evacuation from among the evacuatable slices, with no more than the per-iteration limit (e.g., 4) of occupied slices being selected, (2) moving data from the selected slices to the remaining slices of the set to thereby empty the selected slices, and (3) subsequently (i) updating metadata of the file system to reflect the moving of the data and (ii) de-provisioning the selected slices from the file-system to return them to the pool for subsequent re-provisioning to the file systems.

Figure 17:
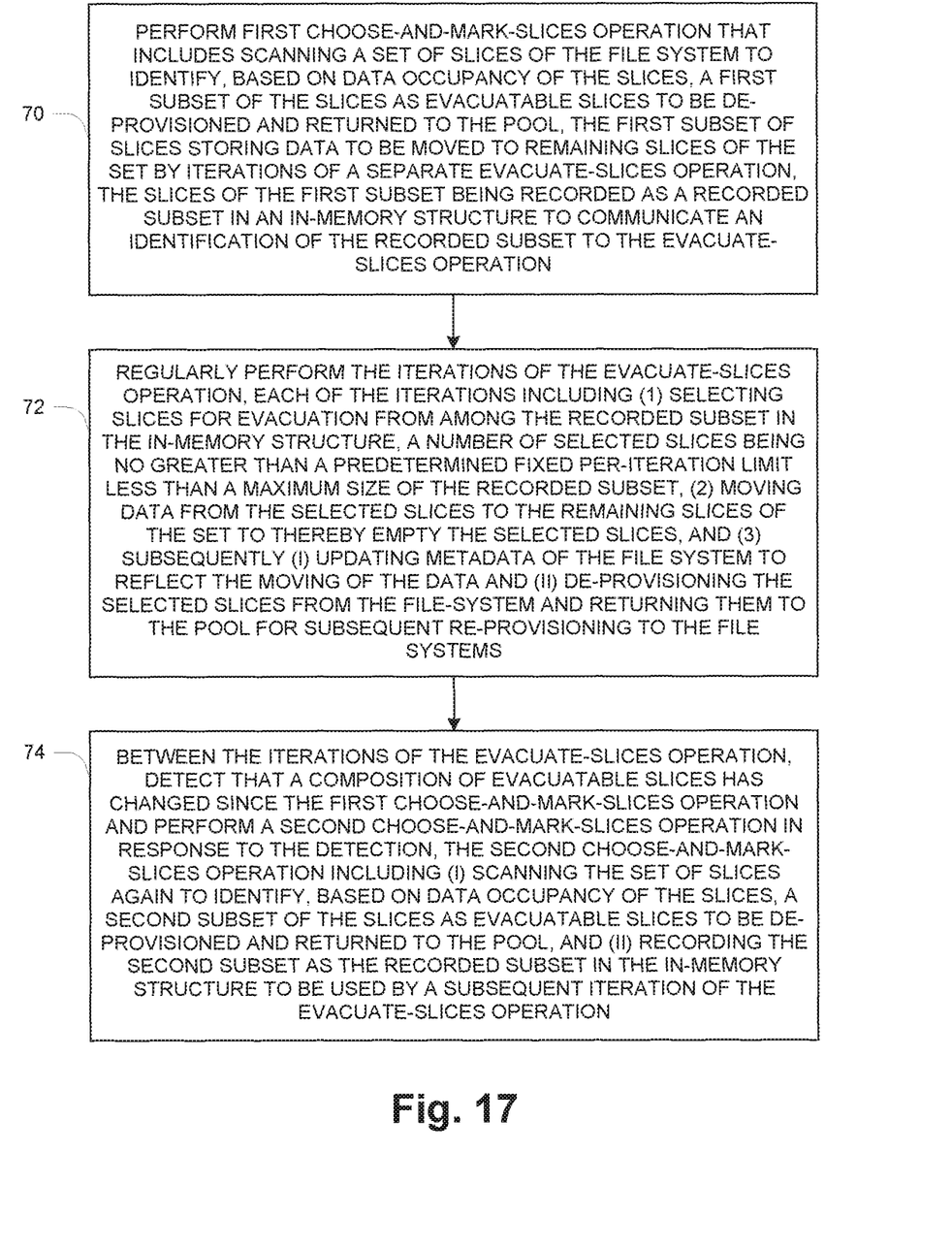

FIG. 17 presents a high-level flow of operation as described herein according to a second aspect, which includes detecting a change in the composition of the evacuatable slices to re-execute choose-and-mark-slices and thereby improve evacuation efficiency and effectiveness. An example is given above with reference to FIGS. 11-15. A data storage system (e.g. 10) is operated to manage use of a pool of secondary storage by internal file systems hosting respective logical data storage objects accessed by clients of the data storage system, the pool being organized into fixed-size slices dynamically provisioned to and de-provisioned from the file systems. The illustrated operation is for an individual file system, and it will be appreciated that it is repeated for other file systems drawing storage from the same pool.

At 70, a first choose-and-mark-slices operation is performed that includes scanning a set of slices of the file system to identify, based on data occupancy of the slices, a first subset of the slices as evacuatable slices to be de-provisioned and returned to the pool. The first subset of slices store data to be moved to remaining slices of the set by iterations of a separate evacuate-slices operation, and the slices of the first subset are recorded as a recorded subset in an in-memory structure to communicate an identification of the recorded subset to the evacuate-slices operation.

At 72, the iterations of the evacuate-slices operation are regularly performed, each of the iterations including (1) selecting slices for evacuation from among the recorded subset in the in-memory structure, a number of selected slices being no greater than a predetermined fixed per-iteration limit less than a maximum size of the recorded subset, (2) moving data from the selected slices to the remaining slices of the set to thereby empty the selected slices, and (3) subsequently (i) updating metadata of the file system to reflect the moving of the data and (ii) de-provisioning the selected slices from the file-system and returning them to the pool for subsequent re-provisioning to the file systems.

At 74, between the iterations of the evacuate-slices operation, it is detected that a composition of evacuatable slices has changed since the first choose-and-mark-slices operation, and a second choose-and-mark-slices operation is performed in response to this detection, the second choose-and-mark-slices operation including (i) scanning the set of slices again to identify, based on data occupancy of the slices, a second subset of the slices as evacuatable slices to be de-provisioned and returned to the pool, and (ii) recording the second subset as the recorded subset in the in-memory structure to be used by a subsequent iteration of the evacuate-slices operation.

While various embodiments of the invention have been particularly shown and described, it will be understood by those skilled in the art that various changes in form and details may be made therein without departing from the scope of the invention as defined by the appended claims.

What is claimed is:

1. A method of operating a data storage system to manage use of a pool of secondary storage by internal file systems hosting respective logical data storage objects accessed by clients of the data storage system, the pool being organized into fixed-size slices dynamically provisioned to and de-provisioned from the file systems, the method comprising, for each file system:

performing a choose-and-mark-slices operation that includes scanning a set of slices of the file system to identify, based on data occupancy of the slices, a subset of the slices as evacuatable slices to be de-provisioned and returned to the pool, the subset of slices storing data to be moved to remaining slices of the set by iterations of a separate evacuate-slices operation, the subset having a size exceeding a predetermined fixed per-iteration limit observed by the evacuate-slices operation in each iteration thereof, the slices of the subset being recorded in an in-memory structure to communicate an identification of the subset to the evacuate-slices operation; and regularly performing the iterations of the evacuate-slices operation, each iteration (1) examining the in-memory structure to select slices for evacuation from among the evacuatable slices, with no more than the per-iteration limit of occupied slices being selected, (2) moving data from the selected slices to the remaining slices of the set to thereby empty the selected slices, and (3) subsequently (i) updating metadata of the file system to reflect the moving of the data and (ii) de-provisioning the selected slices from the file-system to return them to the pool for subsequent re-provisioning to the file systems, wherein the choose-and-mark-slices operation and each iteration of the evacuate-slices operation are independently scheduled such that (1) the choose-and-mark-slices operation identifies the subset of slices and records the subset in the in-memory structure in a single pass notwithstanding that the size of the subset exceeds the per-iteration limit of the evacuate-slices operation, (2) a first iteration of the evacuate-slices operation selects and operates on a first group of the slices of the subset recorded in the in-memory structure, the first group having a size equal to the per-iteration limit, and (3) a subsequent second iteration of the evacuate-slices operation selects and operates upon other slices of the subset remaining after the first iteration of the evacuate-slices operation.

2. The method of claim 1, wherein each of the slices includes a predetermined number of fixed-size data blocks, and the choose-and-mark-slices operation and evacuate-slices operation use an intermediate multiple-block segment as a data unit in evaluating occupancy and moving data from a selected slice to a remaining slice.

3. The method of claim 1, wherein operation of the data storage system further includes regular file operations of the file system including allocating provisioned slices to store newly written file data, and wherein the allocating of provisioned slices avoids using slices marked for evacuation as recorded in the in-memory structure.

4. The method of claim 1, wherein operation of the data storage system further includes a virtual pooling process regularly performing relocation of provisioned slices within the file system, the virtual pooling process being unaware of slice marking for evacuation, and the per-iteration limit is selected to limit duplicate data movement occurring when the virtual pooling process relocates slices marked for evacuation.

5. The method of claim 1, wherein examining the in-memory structure to select slices for evacuation results in selecting the per-iteration limit of occupied slices as well as additional slices that are fully unoccupied and thus require no data movement for evacuation.

6. The method of claim 1, wherein the choose-and-mark-slices operation identifies slices for evacuation according to decreasing data occupancy so that more-occupied slices are evacuated before less-occupied slices.

7. The method of claim 6, wherein the slices are identified using an ordered list.

8. The method of claim 1, wherein the choose-and-mark-slices operation is triggered on a timing basis to be performed periodically.

9. The method of claim 1, wherein the choose-and-mark-slices operation is triggered on an event basis to be performed in response to occurrence of an operational event.

10. The method of claim 9, wherein the operational event is one or more of (1) deletion of a logical object stored as a file in the file system, and (2) a size of a map-for-deallocate reaches a predefined threshold.

11. A data storage system, comprising:
data storage devices providing media for secondary storage;
interface circuitry coupling the data storage system to the data storage devices and to remote data storage clients; and
processing circuitry storing and executing computer program instructions to cause the data storage system to perform a method of managing use of a pool of secondary storage by internal file systems hosting respective logical data storage objects accessed by data storage clients, the pool being drawn from the media of the data storage devices and being organized into fixed-size slices dynamically provisioned to and de-provisioned from the file systems, the method including:
performing a choose-and-mark-slices operation that includes scanning a set of slices of the file system to identify, based on data occupancy of the slices, a subset of the slices as evacuatable slices to be de-provisioned and returned to the pool, the subset of slices storing data to be moved to remaining slices of the set by iterations of a separate evacuate-slices operation, the subset having a size exceeding a predetermined fixed per-iteration limit observed by the evacuate-slices operation in each iteration thereof, the slices of the subset being recorded in an in-memory structure to communicate an identification of the subset to the evacuate-slices operation; and
regularly performing the iterations of the evacuate-slices operation, each iteration (1) examining the in-memory structure to select slices for evacuation from among the evacuatable slices, with no more than the per-iteration limit of occupied slices being selected, (2) moving data from the selected slices to the remaining slices of the set to thereby empty the selected slices, and (3) subsequently (i) updating metadata of the file system to reflect the moving of the data and (ii) de-provisioning the selected slices from the file-system to return them to the pool for subsequent re-provisioning to the file systems,
wherein the choose-and-mark-slices operation and each iteration of the evacuate-slices operation are independently scheduled such that (1) the choose-and-mark-slices operation identifies the subset of slices and records the subset in the in-memory structure in a single pass notwithstanding that the size of the subset exceeds the per-iteration limit of the evacuate-slices operation, (2) a first iteration of the evacuate-slices operation selects and operates on a first group of the slices of the subset recorded in the in-memory structure, the first group having a size equal to the per-iteration limit, and (3) a subsequent second iteration of the evacuate-slices operation selects and operates upon other slices of the subset remaining after the first iteration of the evacuate-slices operation.

12. The data storage system of claim 11, wherein each of the slices includes a predetermined number of fixed-size data blocks, and the choose-and-mark-slices operation and evacuate-slices operation use an intermediate multiple-block segment as a data unit in evaluating occupancy and moving data from a selected slice to a remaining slice.

13. The data storage system of claim 11, wherein operation of the data storage system further includes regular file operations of the file system including allocating provisioned slices to store newly written file data, and wherein the allocating of provisioned slices avoids using slices marked for evacuation as recorded in the in-memory structure.

14. The data storage system of claim 11, wherein operation of the data storage system further includes a virtual pooling process regularly performing relocation of provisioned slices within the file system, the virtual pooling process being unaware of slice marking for evacuation, and the per-iteration limit is selected to limit duplicate data movement occurring when the virtual pooling process relocates slices marked for abandonment.

15. The data storage system of claim 11, wherein examining the in-memory structure to select slices for evacuation results in selecting the per-iteration limit of occupied slices as well as additional slices that are fully unoccupied and thus require no data movement for evacuation.

16. The data storage system of claim 11, wherein the choose-and-mark-slices operation identifies slices for evacuation according to decreasing data occupancy so that more-occupied slices are evacuated before less-occupied slices.

17. The data storage system of claim 16, wherein the slices are identified using an ordered list.

18. The data storage system of claim 11, wherein the choose-and-mark-slices operation is triggered on a timing basis to be performed periodically.

19. The data storage system of claim 11, wherein the choose-and-mark-slices operation is triggered on an event basis to be performed in response to occurrence of an operational event.

20. The data storage system of claim 19, wherein the operational event is one or more of (1) deletion of a logical object stored as a file in the file system, and (2) a size of a map-for-deallocate reaches a predefined threshold.

21. The method of claim 1, further including:
maintaining a per-file-system counter identifying a current number of marked slices; and
in response to the difference between the current number of marked slices and a current number of evacuatable slices crossing a predefined threshold, (1) unmarking the currently marked slices, and (2) re-performing the choose-and-mark-slices operation to mark all current evacuatable slices, thereby responding to events that free substantial amounts of data to promote efficiency and effectiveness of space reclamation.

22. The data storage system of claim 11, wherein operation of the data storage system further includes:
maintaining a per-file-system counter identifying a current number of marked slices; and
in response to the difference between the current number of marked slices and a current number of evacuatable slices crossing a predefined threshold, (1) unmarking the currently marked slices, and (2) re-performing the choose-and-mark-slices operation to mark all current evacuatable slices, thereby responding to events that free substantial amounts of data to promote efficiency and effectiveness of space reclamation.

* * * * *